United States Patent
Foote et al.

(10) Patent No.: US 9,615,067 B1
(45) Date of Patent: Apr. 4, 2017

(54) HEAD MOUNTED DIGITAL VIEWING SYSTEM

(71) Applicants: Bobby D. Foote, Marion, IA (US);
James E. Melzer, Encinitas, CA (US);
David W. Jensen, Marion, IA (US)

(72) Inventors: Bobby D. Foote, Marion, IA (US);
James E. Melzer, Encinitas, CA (US);
David W. Jensen, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 468 days.

(21) Appl. No.: 13/869,564

(22) Filed: Apr. 24, 2013

(51) Int. Cl.
*H04N 7/18* (2006.01)

(52) U.S. Cl.
CPC .................................. *H04N 7/185* (2013.01)

(58) Field of Classification Search
CPC ........................... H04N 13/0429; H04N 7/185
USPC .......................................................... 348/158
See application file for complete search history.

(56) References Cited

U.S. PATENT DOCUMENTS

| | | | |
|---|---|---|---|
| 6,560,029 B1 * | 5/2003 | Dobbie | G02B 23/125 |
| | | | 2/6.1 |
| 7,457,040 B2 | 11/2008 | Amitai | |
| 7,693,167 B2 | 4/2010 | Koenck et al. | |
| 8,233,204 B1 | 7/2012 | Robbins et al. | |
| 8,355,610 B2 | 1/2013 | Simmonds | |
| 8,376,548 B2 | 2/2013 | Schultz | |
| 8,405,573 B2 | 3/2013 | Lapidot | |
| 2008/0158256 A1 * | 7/2008 | Russell | G06T 7/0026 |
| | | | 345/629 |
| 2009/0228693 A1 | 9/2009 | Koenck et al. | |
| 2012/0120482 A1 * | 5/2012 | Hedges | A42B 3/04 |
| | | | 359/353 |
| 2012/0200918 A1 * | 8/2012 | Rivkin | G02B 23/125 |
| | | | 359/481 |
| 2012/0242678 A1 * | 9/2012 | Border | G02B 27/0093 |
| | | | 345/589 |
| 2013/0044376 A1 | 2/2013 | Valera et al. | |

OTHER PUBLICATIONS

Thales Avionics S.A.; TopOwl® Product Brochure, 2010, 6 Pages.
(Continued)

*Primary Examiner* — Paulos M Natnael
*Assistant Examiner* — Justin Sanders
(74) *Attorney, Agent, or Firm* — Lawrence N. Ginsberg

(57) ABSTRACT

The head mounted digital viewing system includes a sensor system, positionable substantially directly in front of the eyes of the user. The sensor system provides sensor video data. An image processing system is configured to receive the sensor video data. The image processing system modifies the sensor video data and provides display video data. A display system is positionable substantially in front of the eyes of the user. The display system is configured to receive the display video data and provide a display image to at least one eye of the user. The display system is positionable between the sensor system and at least one eye of the user. The line of sight of the sensor system and the display system are substantially aligned with the line of sight of at least one eye of the user. The sensor system and the display system are mechanically separate from each other and mechanically aligned with each other.

17 Claims, 5 Drawing Sheets

(56) References Cited

OTHER PUBLICATIONS

Melvyn E. Kalich, et al.; A Limited Flight Study for Investigating Hyperstereo Vision; Proc. of SPIE vol. 6557, 65570I, (2007); 14 Pages.
Alex Cameron; The Application of Holographic Optical Waveguide Technology to Q-SIGHT™ Family of Helmet Mounted Displays; Proc. of SPIE vol. 7326, 73260H; 2009; 11 Pages.
Hiroshi Mukawa, et al.; 8.4: Distinguished Paper: A Full Color Eyewear Display Using Holographic Planar Waveguides; SID 08 Digest; pp. 89-92; 2008; 4 Pages.
U.S. Appl. No. 13/692,368, filed Dec. 3, 2012, Entitled "Colorization of Digital Imagery".
U.S. Appl. No. 12/570,528, filed Sep. 30, 2009, Entitled "Imaging System".

* cited by examiner

HEAD MOUNTED DIGITAL VIEWING SYSTEM

BACKGROUND OF THE INVENTION

1. Field of the Invention

The present invention relates generally to head mounted displays; and, more particularly to a head mounted digital viewing system that minimizes issues of hyperstereopsis, crew station obscuration, and reduced through-canopy optical performance and allows the user to see in low light conditions.

2. Description of the Related Art

Analog night vision systems such as those known the night vision industry as the PVS-14, the PVS-7, the AN/PSQ-20 (for ground soldiers) and the AN/AVS-6 (for helicopter pilots) have been successfully used for quite some time. These devices use image intensifier tubes with microchannel plates, to amplify available light at night from stars, moon, and cultural lighting in the near infrared (600-900 nm spectral region). Users view the amplified image on a phosphor screen, which is magnified by an eyepiece lens.

Digital night vision systems generally using conventional optics and displays are now being considered for future helmet mounted display programs in multiple applications which will replace current analog systems. These digital night vision systems physically mimic existing analog night vision designs and mounting.

Many digital systems typically mount the sensors above or beside the eyes, or provide a direct view digital configuration, routing the imagery using conventional optics to the user's eyes. This places a significant amount of weight in front of the user's eyes, which can compromise head/neck biomechanics in the event of a crash, ejection or fall.

Putting the sensors above or beside the user's eyes changes their viewpoint location such that it is not directly in line with their eyes. Since aircraft cockpits are designed to be viewed from the so called "Design Eye," displacing the sensor location may result in a pilot looking through a canopy strut or obstruction and the inability to see critical cockpit display information. While this offset may not have as much impact on a ground soldier, it is not compatible with aircraft cockpit design. In addition, a wide sensor separation causes a problem known as "hyperstereopsis" which can seriously compromise the pilot's ability to fly by erroneously exaggerating stereo depth perception.

Night vision image quality is limited by shot noise, ambient irradiance and the dynamic range of the intensifier tube. At low light levels, the noise sources can interfere with the user's perception. When the user switches their viewing perspective from light to dark areas, it is possible that they may miss seeing a critical object.

Commercial head mounted displays exist, have been patented, or otherwise disclosed, and have marketed under the brands: Vuzix Smart Glasses M100, Google Glass, MicroSoft Glasses, and Lumus OE-32. These display systems have transparent displays that are positioned to the side of the eye or substantially in front of the eye. Most of these include only a display interface. Google Glass includes a sensor; however, both the display and camera are positioned to the side of the eye. MicroSoft Glasses also includes a sensor positioned between the user's eyes.

SUMMARY OF THE INVENTION

In one broad aspect, the present invention is embodied as a head mounted digital viewing system. The head mounted digital viewing system includes a sensor system, positionable substantially directly in front of the eyes of the user. The sensor system provides sensor video data. An image processing system is configured to receive the sensor video data. The image processing system modifies the sensor video data and provides display video data. A display system is positionable substantially in front of the eyes of the user. The display system is configured to receive the display video data and provide a display image to at least one eye of the user. The display system is positionable between the sensor system and at least one eye of the user. The line of sight of the sensor system and the display system are substantially aligned with the line of sight of at least one eye of the user. The sensor system and the display system are mechanically separate from each other and mechanically aligned with each other. As used herein the terms "head mounted" and "helmet mounted" can be used interchangeably.

The sensor system includes at least one sensor positionable substantially directly in front of one or both of the user's eyes. The display system comprises at least one display positionable between said at least one sensor and at least one eye of the user. The line of sight of each sensor and each display are substantially aligned with the line of sight of the user.

The image processing system can provide vehicle commanded symbology in monochrome and/or color. The image processing system can provide image enhancements such as noise reduction and dynamic range enhancement for improved image quality.

This approach could be monocular (one eye viewing one sensor), biocular (two eyes, each viewing the same sensor), or binocular (two eyes, each viewing a different sensor)

Digital night vision imagery goes from the digital sensor (one in front of each eye, preferably), through the image processing electronics to a compact waveguide display. This allows image enhancements such as noise reduction and enhanced dynamic range, unlike standard night vision goggles with analog image intensifier tubes.

Combining the display, processing and night sensors in a single unit reduces video latency and its associated perceptual and physical issues.

Locating the sensor in front of the eye eliminates the problem with hyperstereopsis (sensors located at the outside of the helmet) and offset, which can cause perceptual errors.

The digital sensors can be flipped up when not in use so the user can view imagery from the waveguide optics only.

Locating sensors in front of the eye means the user can see cockpit displays and the outside world from the correct Design Eye location in the cockpit without interference with canopy bows or other structures.

Eliminating the display in the digital sensor reduces weight, size, and cost.

Other objects, advantages, and novel features will become apparent from the following detailed description of the invention when considered in conjunction with the accompanying drawings.

DETAILED DESCRIPTION OF THE INVENTION

Figure 1:
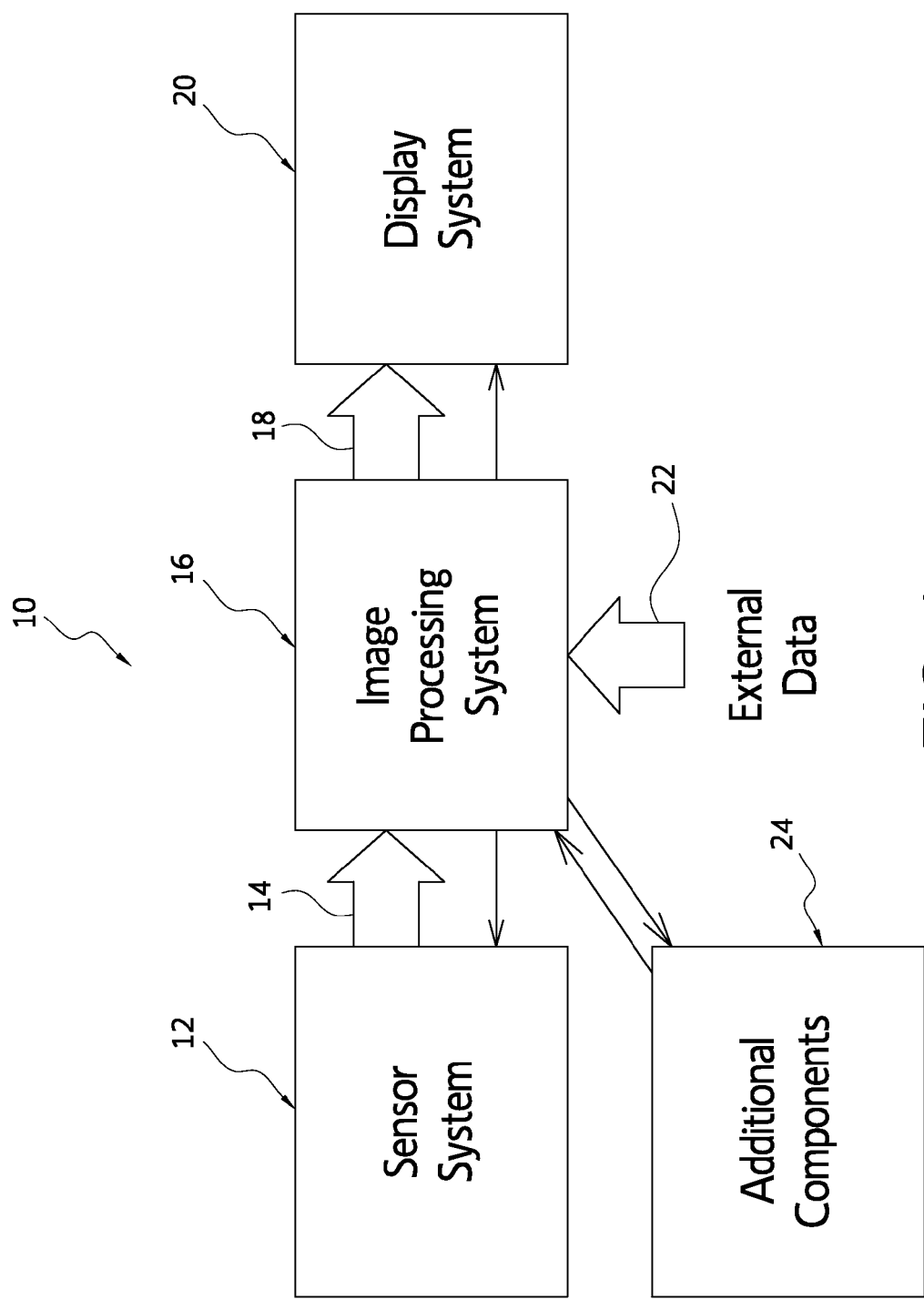
FIG. 1 is a schematic illustration of the head mounted digital viewing system of the present invention.

Referring now to the drawings and the characters of reference marked thereon, FIG. 1 illustrates the head mounted digital viewing system of the present invention, designated generally as 10. The head mounted digital viewing system 10 includes a sensor system 12, positionable substantially directly in front of the eyes of the user. The sensor system 12 provides sensor video data 14. An image processing system 16 is configured to receive the sensor video data 14. The image processing system 16 modifies the sensor video data 14 and provides display video data 18. A display system 20 is positionable substantially in front of the eyes of the user. The display system 20 is configured to receive the display video data 18 and provide a display image to at least one eye of the user. The display system 20 is positionable between the sensor system 12 and at least one eye of the user. The line of sight of the sensor system 12 and the display system 20 are substantially aligned with the line of sight of at least one eye of the user. The sensor system 12 and the display system 20 are mechanically separate from each other and mechanically aligned with each other.

The sensor system 12 includes a sensor capable of augmenting the user's vision and is operable in spectral bands between about 400 nm and 12 microns. Preferably it is a digital sensor that operates between 600-900 nm, similar to analog night vision goggles. To expand the spectral band sensitivity to other wavebands, the sensor system 12 can include additional sensors. Such digital sensors are commercially available. The sensor system 12 may also have multi-spectral capability, and commercial sensors exist to provide detection of light in the Visible, Ultra-Violet (UV), Near Infra-Red (NIR), Short Wave Infra-Red (SWIR), and Long Wave Infra-Red (LWIR). Various military and commercial applications use different combinations of these sensors.

The image processing system video stream 18 optimization includes processing with algorithms to improve sensor, display, and system performance. Example sensor algorithms include non-uniformity correction (NUC), bad pixel correction, scintillation and noise correction, gain control, and contrast enhancement. Example display algorithms include gamma correction, electro-optic correction, distortion correction, symbology overlay, stitching/wide-field-of-view, and scaling/magnification. Example system algorithms include external video interface, fusion of sensor and synthetic imagery, low light color enhancement, feature extractions, hands free focus, tracker synchronization, and video window (such as picture-in-picture). The image processing system video stream may also be linked to a recording device for image recording and play back; and vehicle telemetry and/or fault recording system. Implementation of these types of algorithms is known to those skilled in this field.

The image processing system video stream optimization also includes processing raw video streams to produce higher level knowledge for the user. Knowledge-based algorithms include target recognition, motion prediction, and threat warnings. Such algorithms produce textual or image highlighting to fuse with the display video stream. Implementation of these types of algorithms is known to those skilled in this field.

The image processing system 16 is preferably a low-power, high-performance, low-latency processor. As used herein, the term "low-power" refers to the electric energy used and measured in watts (joules per second). Using less than 10 watts is preferred in a vehicle to reduce heat. Using less than 2 watts is preferred in a battery operated system. As used herein the term "high-performance" refers to the number of computing operations performed and measured in giga-operations per second (GOPS). Providing more than 100 GOPS is a lower threshold for a set of fundamental image processing algorithms. Proving more than 1000 GOPS is a useful threshold for a rich set of image processing algorithms. As used herein the term "low-latency" refers the processing time and delay for the video stream through the processor. A latency of less than one frame (16.6 ms with a 60 Hz frame rate) is preferred for these systems.

The image processing system 16 can be implemented using hardware logic, Digital Signal Processors (DSPs), Field Programmable Gate Arrays (FPGAs), Graphic Processing Units (GPUs) or General Purpose Processors (GPPs). The image data could be streamed through the system 10 without using memory. The preferred embodiment is a programmable ASIC containing multiple microprocessor cores and is often called a multicore. It is well understood that the multicore processor provides a good balance between software programmability, low-latency, and low-power processing. Embodiments of the multicore are described in, for example, U.S. Pat. No. 7,693,167, entitled, "Mobile Nodal Based Communication System, Method and Apparatus", issued to Koenck et. al.; and, U.S. Pat. Publication No. 20090228693 entitled "System and Method for Large Microcoded Programs," to Koenck et al. The '167 patent and the '693 patent application are both assigned to the present assignee Rockwell Collins, Inc. Cedar Rapids, Iowa. The multicore technology developed by Rockwell Collins, is marked under the trademark "Micro-Core" and both of these cases disclose applications of this MicroCore technology.

Koenck et. al. disclose a processor that includes a stored program maintained in a very long instruction word (VLIW) microcoded program memory, and data manipulation facility comprised of a register file and an arithmetic logic unit (ALU). With these two blocks, the processor executes instructions, performs program control flow including conditional tests, branches, and subroutine linkage, and performs Boolean and arithmetic functions in a very small physical and power footprint. These processors are small and energy efficient and referenced as MicroCore processors.

A multicore processing architecture may be configured to provide a high performance computing system. Using very small, energy efficient processors like the MicroCore and interconnecting them together into a multicore processing array with a simple mesh communication network, it is possible to create a high performance parallel image processing system that is capable of being powered by batteries.

Multiple parallel processors may be allocated to the image processing problem based on pixel blocks. In an exemplary embodiment, blocks of 128×128 image pixels may be associated with each MicroCore processor, and an array of 13×10 of such MicroCore processors may be configured to provide image processing for an image sensing array of 1600×1200 pixels. The total power consumption of each processor may be approximately 5 mW, resulting in a total power consumption of approximately 650 mW for a 13×10 array of processors.

The image processing system may use single image enhancement algorithms and/or multiple image enhancement algorithms, as will be discussed below in more detail.

The display system 20 preferably comprises a waveguide optic to direct imagery to the user's eye. This reduces the overall size of the head mounted digital viewing system 10, and brings it closer to the user's face relative to conventional night vision goggles. Doing so brings the center of gravity of the head mounted digital viewing system 10, closer to the anatomical landmark of the Tragion Notch reducing the torque on the neck relative to conventional night vision goggles, improving ejection and crash safety and comfort for the user. Waveguide optics are described in, for example, U.S. Pat. No. 8,233,204, entitled, "Optical Displays", issued to Robbins et al.; U.S. Pat. No. 8,405,573, entitled, "Distributed Head-Mounted Display System", issued to Lapidot et al.; and, U.S. Pat. No. 7,457,040, entitled, "Light Guide Optical Device", issued to Amitai.

The image processing system 16 converts a set of input video data from sensors 14, additional components 24, and external data 22 to an output display video data 18. The set of input video data is processed with algorithms to a format to meet specific user's requirements. The set of external data 22 may include, for example, video input source data from an aircraft-mounted sensor, and/or symbology such as aircraft attitude or altitude, horizon line, compass heading, and fuel status for display to the user.

The head mounted digital viewing system 10 may be augmented by additional components 24, which are not typically positionable substantially in front of the eyes of the user. Such additional components provide additional video streams or data to be algorithmically added to the video streams from the sensor processing unit 14. For example, a low light, low resolution color camera operatively connected to the processing system, can be configured to enhance and provide true colorized night capability to a low light sensor. A similar example to the colorization sensor is the addition of a thermal camera as an additional component operatively connected to the image processing system, configured to provide electronically fused thermal image capability. The addition of navigation data using a Global Positioning System (GPS) and Inertial Management Units (IMUs) as additional components. The addition of other video or position information using a communication unit as an additional component. In all cases, the image processing system manages the image streams and data from the additional components to enhance the video streams from the sensor system 12.

Figure 2:
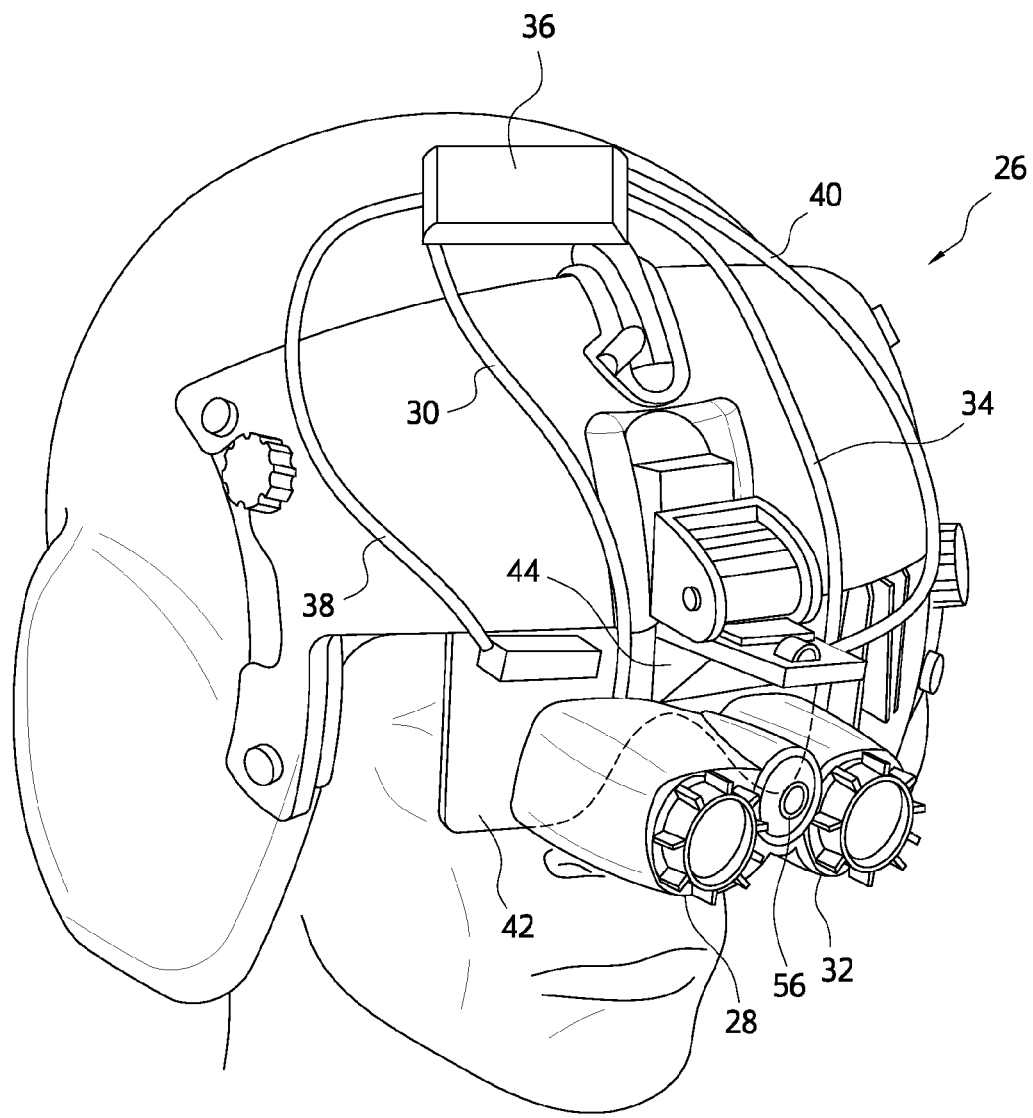
FIG. 2 is a perspective view of an exemplary embodiment of the head mounted digital viewing system of the present invention, shown positioned on a helmet.

Referring now to FIG. 2, an exemplary embodiment of the present invention is illustrated in which the head mounted digital viewing system 26 includes a sensor system with a first sensor 28 positionable substantially directly in front of a first eye of the user. The first sensor 28 provides a first set of sensor video data 30. A second sensor 32 is positionable substantially directly in front of a second eye of the user. The second sensor provides a second set of sensor video data 34. An image processing system 36 is configured to receive the first and second sets of sensor video data 30,34. The image processing system 36 modifies the first and second sets of sensor video data 30,34. The image processing system 36 provides a first set of display video data 38 and a second set of display video data 40. The display system includes a first display 42 positionable substantially directly in front of the first eye of the user. The first display 42 is configured to receive the first set of display video data 38 and provide a first image to the first eye of the user. A second display 44 is positionable substantially directly in front of the second eye of the user. The second display 44 is configured to receive the second set of display video data 40 and provide a second image to the second eye of the user.

Figure 3:
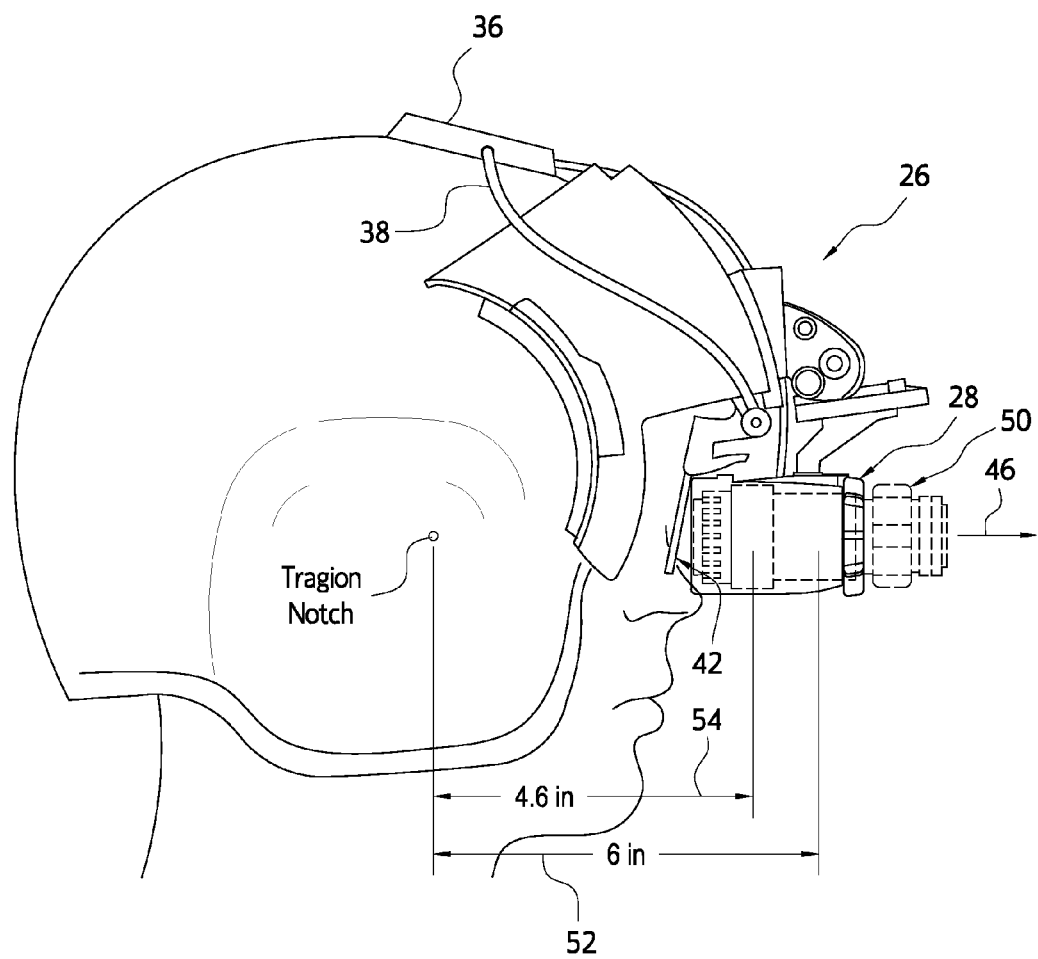
FIG. 3 is a side view of the embodiment of FIG. 2.

Referring now to FIG. 3, a side view of this embodiment illustrates how the line of sight of each sensor and each display are substantially aligned with the line of sight 46 of each eye of the user. Each sensor is positioned within a 2 inch diameter of an imaginary circle defined perpendicular to and parallel with the associated user's eye line of sight 46. Interpupillary distance adjustments may not be required because the exit pupil on the display is large. Furthermore, no individual diopter or focus adjustments are required.

Each of the displays 42, 44 (best seen in FIG. 8) preferably includes a waveguide optic minimizing the size and optimizing the center of gravity of the head mounted digital viewing system 26. The distance between the sensor system and the user's face and the display system and the user's face are reduced relative to conventional night vision goggles, thus reducing the torque on the neck. This improves ejection and crash safety and comfort for the user. In this figure, a standard Aviator's Night Vision Imaging System (ANVIS) night vision goggle is shown in phantom lines 50 overlaid upon the head mounted digital viewing system 26 of the present invention, illustrating an improved center of gravity. As indicated by numeral designation 52 the typical distance of the center of gravity of the night vision goggles to the user's tragion notch is approximately 6.0 inches. With the present invention the typical distance from the center of gravity of the head mounted digital viewing system 26 to the tragion notch is approximately 4.6 inches as indicated by numeral designation 54. Furthermore, this figure illustrates the reduced stand-off dimension from the face. This configuration results in the overall length being more than 1 inch less and a reduction in weight of between 40 to 200 grams compared to the standard night vision goggles. This overall reduction in weight and shorter configuration reduces the moment of inertia on the user's neck by more than 20%.

Each of the waveguide optics may provide monochrome green; monochrome black and white; tri-color red, green and yellow; or full color red, green, blue (RGB) color display. The waveguide optics is preferably transparent. Furthermore, each of the displays may include a waveguide optic configured with photochromic or electrochromic capability to provide sun shade or protection from high luminance threats. The waveguide optic may include an opaque coating or material; or selected wavelength coating and/or dye for protection against laser threat(s).

As discussed above, the image processing system preferably includes MicroCore ASICs or other microcore technology to provide a compact size. It may include recording output capability. Furthermore, it may be configured to accept external data from the set of external data including video input source data, and/or symbology set data for display to the user. Furthermore, it may include single image and/or multiple image algorithms. The image processing system preferably implements on helmet image processing thus providing a low power, low latency capability obviating a requirement for a separate aircraft installed electronics unit. It may also include an interface to a navigation system such as a global positioning satellite (GPS) system, inertial navigation system, inertial measurement unit (IMU).

Turning again to FIG. 2, the sensor system preferably includes additional components, designated as 56 such as a low light, low resolution color camera or thermal camera.

Figure 4:
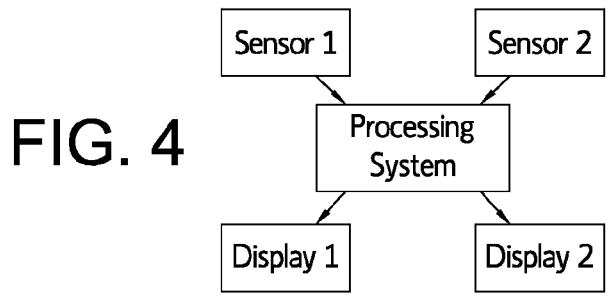
FIG. 4 is a schematic illustration of a system utilizing two sensors, two displays and an imaging processing system.

Referring now to FIG. 4 a schematic figure of the present invention embodied as a stereo system is illustrated utilizing two sensors, two displays and an imaging processing system. However, various other configurations are contemplated by the principles of this invention.

Figure 5:
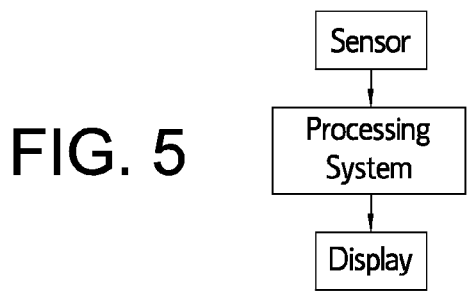
FIG. 5 is a schematic illustration of a system using a single sensor, single or multiple displays and an image processing system.

For example, FIG. 5 schematically illustrates using a single sensor, a single display and an image processing system.

Figure 6:
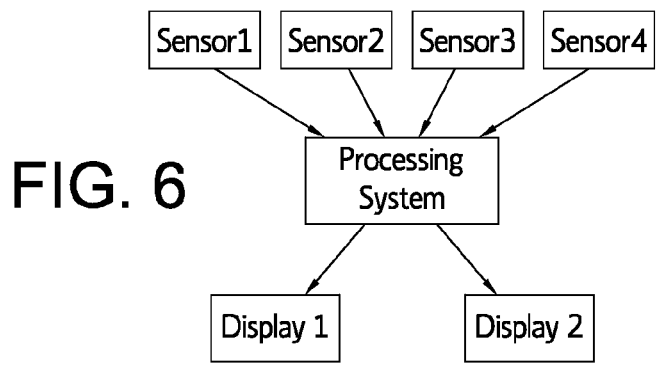
FIG. 6 is a schematic illustration of a system utilizing multiple sensors and two displays.

FIG. 6 schematically illustrates a system with multiple sensors and two displays.

Figure 7:
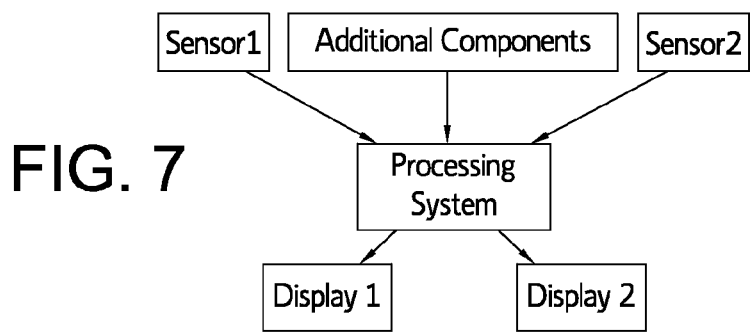
FIG. 7 is a schematic illustration of a system utilizing additional components.

FIG. 7 schematically illustrates a system such as that shown in FIG. 4 with additional components.

Figure 8:
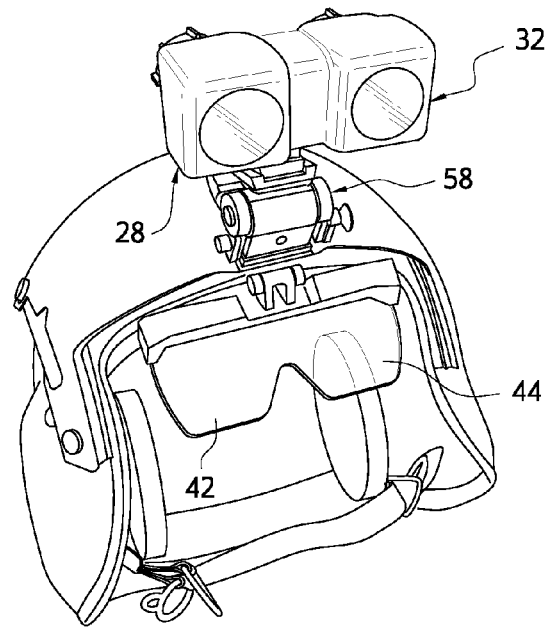
FIG. 8 illustrates the sensor system being flipped up during use.

FIG. 8 illustrates the sensor system being flipped up (to the forehead) for use when the sensor system is not needed such as for daytime use. This is accomplished by pivoting the sensor using the mounting mechanism 58.

Figure 9:
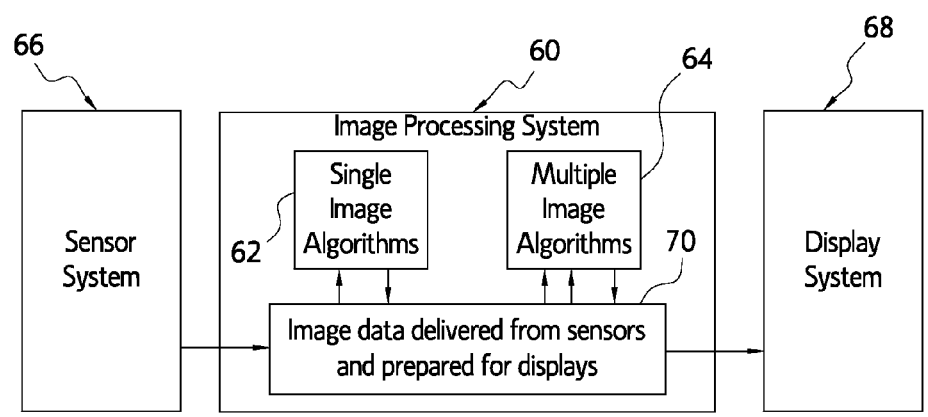
FIG. 9 a schematic illustration of a system in which the image processing system uses single image algorithms and multiple image algorithms The same elements or parts throughout the figures of the drawings are designated by the same reference characters, while equivalent elements bear a prime designation.

Referring now to FIG. 9, in one embodiment of the present invention, the image processing system 60 uses single image algorithms 62 and multiple image algorithms 64. Examples of single image algorithms include but are not limited to lens distortion correction, noise reduction, false colorization, automatic dynamic range adjustment, scaling, cropping, and gamma correction. These single image algorithms process a single set of sensor data typically from a single sensor. Implementation of these types of algorithms may be accomplished by methods known to those skilled in this field.

Examples of the multiple image algorithms include but are not limited to fusion, registration, colorization, mutual information, superpositioning, and stitching. These multiple image algorithms typically process two or more sets of sensor data and reduce those sets to a single set of data. FIG. 9 illustrates the interfaces between the sensor system 66, image processing system 60, and display system 68. A single set of image data is being processed by the single image algorithms. Two (multiple) sets of image are processed by the multiple image algorithms. Processing block 70 illustrates that the image data can be embodied as computer memory or an image frame buffer. The algorithms can be embodied as software executables processing the image data in memory. The image algorithms can be implemented in hardware, microcode, or software by methods known to those skilled in this field.

Other embodiments and configurations may be devised without departing from the spirit of the invention and the scope of the appended claims.

The invention claimed is:

1. A head mounted digital viewing system, comprising:
 a) a sensor system having night vision, said sensor system including a first sensor and a second sensor, each sensor being positionable substantially directly in front of a respective eye of the user, said sensor system providing sensor video data;
 b) an image processing system configured to receive the sensor video data, said image processing system for digitally combining and modifying said sensor video data, said image processing system providing display video data; and,
 c) a display system positionable substantially in front of the eyes of the user, said display system including a first display and a second display, each display being positionable substantially in front of a respective eye of the user said display system configured to receive the display video data and provide a display image to the eyes of the user, wherein each said display is positionable between each sensor and a respective eye of the user;
 wherein the line of sight of each sensor and display are configured to be substantially aligned with the line of sight of an eye of the user during night vision use, wherein said sensor system and said display system are mechanically separate from each other and are mechanically aligned with each other and, wherein only said sensor system is configured to be flipped up for daytime use.

2. The head mounted digital viewing system of claim 1, wherein each sensor is positioned within a 2 inch diameter of an imaginary circle defined perpendicular to and parallel with the associated user's eye line of sight.

3. The head mounted digital viewing system of claim 1, wherein each of the displays comprises a waveguide optic minimizing the size and optimizing the center of gravity of the head mounted digital viewing system, wherein the distance between the sensor system and the user's face and the display system and the user's face are reduced relative to conventional night vision goggles, thus reducing the torque on the neck relative to conventional night vision goggles, improving ejection and crash safety and comfort.

4. The head mounted digital viewing system of claim 3, wherein each of the waveguide optics provides monochrome green; monochrome black and white; tri-color red, green and yellow; or full color red, green, blue (RGB) color display.

5. The head mounted digital viewing system of claim 1, wherein each of the displays comprises a waveguide optic configured to provide sunlight eye protection and laser eye protection from high luminance threats.

6. The head mounted digital viewing system of claim 1, wherein said image processing system comprises on helmet image processing thus providing a low power, low latency capability obviating a requirement for a separate aircraft installed electronics unit.

7. The head mounted digital viewing system of claim 1, wherein said image processing system is configured to accept external data from the set of external data including video input source data, and/or symbology set data for display to the user.

8. The head mounted digital viewing system of claim 1, wherein said image processing system comprises single image enhancement algorithms.

9. The head mounted digital viewing system of claim 1, wherein said image processing system comprises multiple image enhancement algorithms.

10. The head mounted digital viewing system of claim 1, wherein the sensor system is configured to be flipped up to the forehead area for daytime use.

11. The head mounted digital viewing system of claim 1, wherein said sensor system, comprises multi-spectral capability in available sensor ranges.

12. The head mounted digital viewing system of claim 1, further comprising a low light, low resolution color camera operatively connected to the imaging processing system, configured to provide true colorized night capability.

13. The head mounted digital viewing system of claim 1, further comprising a thermal camera operatively connected to the image processing system, configured to provide electronically fused thermal image capability.

14. The head mounted digital viewing system of claim 1, wherein the reduced weight and shortened distance relative to the user's anatomical tragion notch reduces the moment of inertia on the user's neck and improves comfort and safety.

15. The head mounted digital viewing system of claim 1, wherein wireless connections are utilized to exchange video and control between the sensor system, the image processing system, and the display system.

16. The head mounted digital viewing system of claim 1, further comprising an interface to a navigation system such as a global positioning satellite (GPS) system, inertial navigation system, inertial measurement unit (IMU); and/or a recording system and telemetry system.

17. A method for providing enhanced head mounted digital viewing, comprising the steps of:
   a) positioning a sensor system having night vision, said sensor system including a first sensor and a second sensor, each sensor being substantially directly in front of a respective eye of the user, said sensor system providing sensor video data;
   b) receiving the sensor video data utilizing an image processing system configured to digitally combine and modify said sensor video data, said image processing system providing display video data; and,
   c) positioning a display system substantially in front of the eyes of the user, said display system including a first display and a second display, each display being positionable substantially in front of a respective eye of the user said display system configured to receive the display video data and provide a display image to the eyes of the user, wherein each said display is positionable between each sensor and a respective eye of the user while during night vision use, and, wherein only said sensor system is configured to be flipped up for daytime use;

wherein the line of sight of each sensor and display are substantially aligned with the line of sight of an eye of the user and wherein said sensor system and said display system are mechanically separate from each other and are mechanically aligned with each other.

* * * * *